United States Patent [19]

Gilmore

[11] Patent Number: 4,703,903
[45] Date of Patent: Nov. 3, 1987

[54] CASSETTE TAPE WINDING DEVICE

[76] Inventor: Mercer D. Gilmore, 208 S. 11th Ave., Wauchula, Fla. 33873

[21] Appl. No.: 838,658

[22] Filed: Mar. 11, 1986

[51] Int. Cl.$^4$ ............................................. G11B 15/42
[52] U.S. Cl. ....................................... 242/179; 242/96; 242/199; 81/448; 81/460; 81/900
[58] Field of Search ............. 242/197, 199, 200, 68.1, 242/67.1 R, 179, 96; 81/436, 460, 177.1, 177.3, 900, 442, 448

[56] References Cited

U.S. PATENT DOCUMENTS

| | | | |
|---|---|---|---|
| 1,075,710 | 10/1913 | Goodwin | 81/436 X |
| 1,831,392 | 11/1931 | Pierce, Jr. | 81/460 X |
| 2,369,853 | 2/1945 | Purtell | 81/460 |
| 2,383,573 | 8/1945 | Tomsek | 81/436 |
| 2,418,638 | 4/1947 | Hoover | 81/436 X |
| 2,487,155 | 11/1949 | Loewy | 81/177.1 X |
| 2,788,817 | 4/1957 | Leniz | 81/436 |
| 3,208,489 | 9/1965 | Walker et al. | 81/460 X |
| 4,147,314 | 4/1979 | Traulsen | 242/199 X |
| 4,191,228 | 3/1980 | Fenton | 81/436 |
| 4,237,754 | 12/1980 | Battrick | 81/436 X |

*Primary Examiner*—John M. Jillions
*Attorney, Agent, or Firm*—Henderson & Sturm

[57] ABSTRACT

A cassette tape winding device 10 comprising: a scored, tapered conical portion (12); a generally cylindrical intermediate shaft portion (13), and a toothed driving portion (14) having a plurality of elongated driving teeth (16) spaced from one another and arranged in a circular pattern on the bottom surface of the intermediate shaft portion.

3 Claims, 6 Drawing Figures

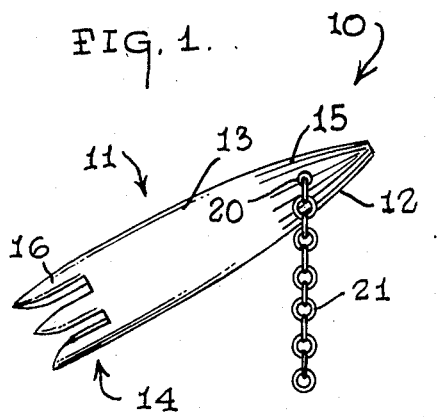
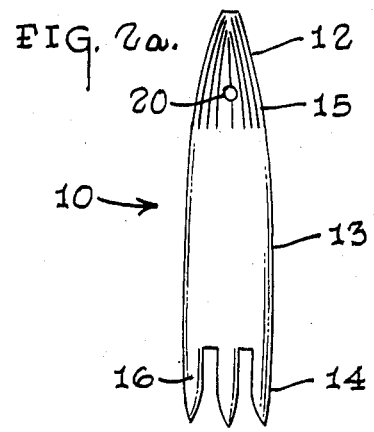
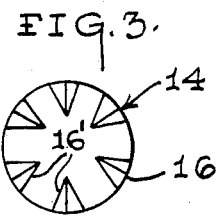
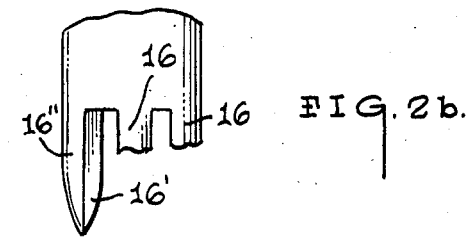
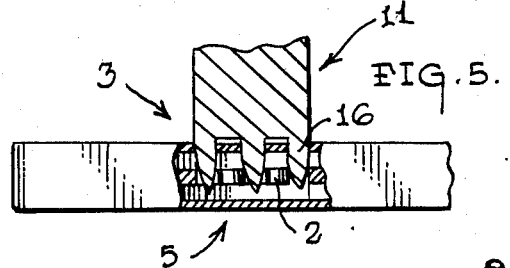
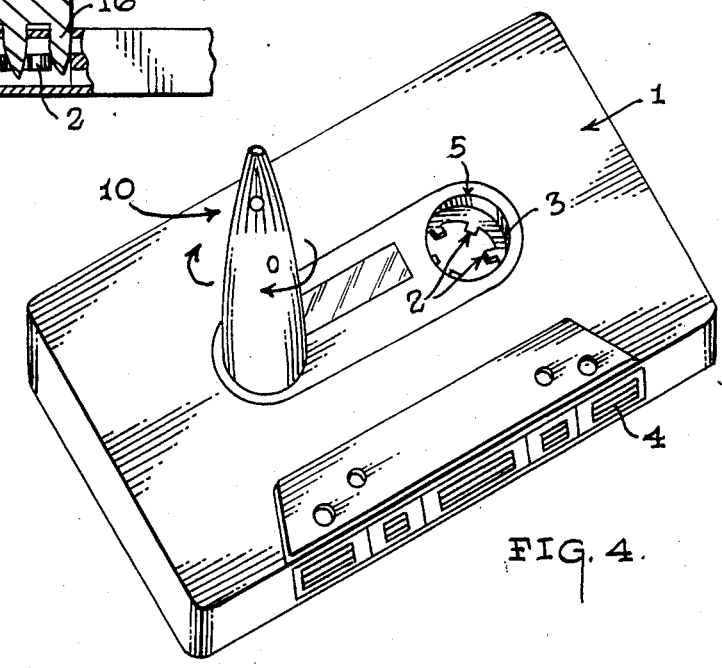

CASSETTE TAPE WINDING DEVICE

TECHNICAL FIELD

This invention relates to a tool used to effect the winding and reeling of a tape contained within a tape cassette cartridge.

BACKGROUND OF THE INVENTION

The present invention involves the subject matter contained in Disclosure Document Program Ser. No. 127,557, which was accorded a filing date of May 18, 1984. As most cassette tape users are well aware, there is a need for a device to turn the tape in a tape cartridge to a desired location, or take up the slack that often develops during periods of non-use, without having to resort to putting the cassette tape into a cassette tape player. Many manufacturers recommend using a pencil for this purpose, but this method is totally unsatisfactory because it does not work well; and also because it can damage or destroy the cassettes.

The only known prior art, even remotely similar in both purpose and function involves U.S. Pat. Nos. 2,369,853; 4,191,228; 2,788,817 and 2,418,638, which are directed to screwdriver type apparatus. These particular devices are not only totally inappropriate for use in the particular environment for which the present invention was specifically developed; but, under certain circumstances the mere presence of this type of tool proximate the tape cartridge could produce deleterious results. In addition the aforementioned structures are neither dimensioned nor configured for use in such a manner.

U.S. Pat. No. 2,369,853 discloses a driver for a socketed screw. It is a two-unit apparatus that would not fit into a cassette tape and, thus, does not serve as a limitation on the present invention.

In U.S. Pat. No. 4,191,228, Fenton invented a torque-actuated tool apparatus. The design and configuration of this particular apparatus is such that the male unit could not conceiveably be adapted for use to fulfill the purpose and function of the cassette tape winding device.

Similarly, U.S. Pat. No. 2,788,817 and U.S. Pat. No. 2,418,638 are structured in such a way as to make them inappropriate for use on cassette tapes.

Based on the foregoing situation, it is obvious that there is a clear and convincing need for a device to wind and rewind cassette tapes without placing them in a cassette tape player. Current viable alternatives, such as using a pencil, are both inefficient and often cause damage to the cassettes. The present invention has been specifically developed to fulfill this need.

BRIEF DESCRIPTION OF THE DRAWINGS

These and other attributes of the invention will become more clear upon a thorough study of the following description of the best mode for carrying out the invention, particularly when reviewed in conjunction with the accompanying drawings, wherein:

FIG. 1 is a perspective view of the preferred embodiment of this invention;

FIG. 2a is a side elevational view of the device; and, FIG. 2b is an enlarged detail view of the lower portion of FIG. 2a.

FIG. 3 is an end view of the device;

FIG. 4 is a perspective view of the device engaged with a tape cassette cartridge; and, FIG. 5 is an enlarged partial cross-sectional view of the toothed engagement betwen the device and one of the cassette sprockets.

SUMMARY OF THE INVENTION

The object of this invention is to provide a device to effect the winding and rewinding of a tape to the desired location in a cassette without the necessity of having to put the cassette tape into a cassette tape player. Cassette tape manufacturers have been known to recommend that a pencil be employed for this purpose, but employing such a method is often ineffective, and always potentially damaging to the cassette tape.

The preferred embodiment of this invention includes a single unit. This unit is designed specifically for use with cassette tapes, and thus, will fit properly and easily into a standard cassette tape unit, for driving the tape reels in the desired direction.

In addition, the diminutive size of the device is a distinct advantage for the user from the standpoint of portability and storage.

This device may even be carried in a purse, pocket or wallet, or carried on a key chain thereby making it available to the user at any time or place. Since the device requires very little space, it can be accommodated by even the most crowded of stereo cabinets and cassette tape holders.

In addition, since the device will be very inexpensive to produce and sell, the consumer may wish to purchase several units to keep in their home, office and/or car.

BEST MODE FOR CARRYING OUT THE INVENTION

As can best be seen by reference to the drawings and in particular to FIG. 1, the cassette tape device is designated generally by the numeral 10. The cassette tape winding device (10) further comprises a single driver unit (11).

As can be seen in FIG. 2, the driver unit (11) comprises three distinct portions: a tapered end portion (12), an intermediate shaft (13) and a toothed driving portion (14). These portions of the driving unit (11) will now be described in seriatim fashion.

The tapered end portion (12) of the driver unit (11) has a generally tapered conical configuration and is further provided with a scored surface (15) to enhance the frictional grip of a user on that portion of the driver unit.

The intermediate shaft portion (13) of the driver unit (11) has a generally elongated cylindrical configuration which extends from the tapered end portion (12) to the toothed driving portion (14) of the driver unit (11).

The toothed driving portion (14) of the driver unit (11) comprises a plurality of elongated narrow driving teeth (16) projecting outwardly from the bottom surface of the intermediate shaft portion (13). In addition the plurality of driving teeth (16) are spaced from one another, and arranged in a circular pattern around the periphery of the bottom surface of the intermediate shaft portion (13) of the driver unit (11).

In as much as the driver unit (11) of the present invention has been specifically developed for use in combination with a cassette tape cartridge (1) several factors had to be tken into consideration regarding not only the material from which the unit (11) is to be fabricated from; but also, the relative dimensioning of the driving teeth, as will be explained presently.

Given the fact that the majority of cassette tapes employ a magnetic base tape, it became imperative that the driver unit be fabricated from a material that would not interfere with the magnetic data stored on the tape; and, to that end the choice of materials from which the driver unit (11) of the preferred embodiment may be constructed has been restricted to either wood or plastic.

Both of the chosen materials (e.g. wood and plastic) have characteristics which lend themselves to the enhanced operation and function of the device (10) for its intended purpose. These characteristics and properties include, but are not limited to: availability, low cost, inertness, malleability, resiliency, frangibility.

As previously mentioned, the driving teeth (16) are arranged in a circular pattern on the bottom surface of the intermediate shaft portion (13). As can best be seen by reference to FIG. 3, each of the driving teeth (16) have a three sided generally triangular cross-sectional configuration, wherein the two interior tooth surfaces (16') define generally straight lines, and the exterior tooth surface (16") defines a curved line.

As should further be appreciated at this juncture, the curved surfaces (16") on the plurality of driving teeth (16) roughly define the circular path of rotation of the driving unit (11), when engaged with the spokes (2) of a cassette spool (3) to effect the winding or reeling of the tape (4).

As can best be seen by reference to FIG. 5, a typical cassette spool (3) is provided with a central generally star shaped recess (5) that is dimensioned to receive one of the cassette drive members (not shown) for advancing or rewinding the tape in a well recognized manner. The recess (5) also forms a plurality of spool spokes (2) which form the contact surface for both the cassette drive member, and the driving teeth (16) (shown in phantom) of the present invention.

As depicted in FIG. 5, the driving teeth (16) are positioned so as to be received within the central recess (5) of the spool (3) and be brought into driving engagement with the spokes (2) by manual rotation of the driving unit (11). It should further be noted that the length and thickness of the driving teeth (16) may be dimensioned to take advantage of the inherent resiliency of the materials chosen, whereby a fail-safe feature is incorporated into the finished product.

In the instance wherein the drive unit (11) is fabricated from plastic; the fail-safe feature would be produced by dimensioning the length and thickness of the drive teeth, such that the drive teeth would be resiliently deformed out of driving engagement, when either the driving or driven spool resisted further rotation such as encountered at the full take-up capacity from the driven spool.

In the instance wherein the drive unit (11) is fabricated from wood; the fail-safe feature would be produced by dimensioning the length and thickness of the drive teeth such that the teeth will fracture upon the application of excessive torque, such as at the end of the take-up capacity of one of the spools.

As shown in FIG. 1, given the relatively small size requirements for the dimensions of the driving unit necessary to produce the desired results, it is also envisioned that the preferred embodiment will be provided with an optional aperture (20) through the tapered end portion (12); whereby the drive unit (11) may be attached to a key chain (21) or the like, to minimize the chances of misplacing or losing the device (10).

Having thereby described the subject matter of this invention, it should be obvious that many substitutions, modifications, and variations of the invention are possible in light of the above teachings. It is therefore to be understood that the invention as taught and described herein is only to be limited to the extent of the breadth and scope of the appended claims.

I claim:

1. A cassette tape winding device to effect the manual winding of a cassette tape spool wherein the device consists of:
   a driver unit comprising three distinct portions: an end portion having a generally tapered conical configuration and being further provided with a scored external surface; an intermediate shaft portion having a generally elongated cylindrical configuration; and, a toothed driving portion comprising a plurality of elongated narrow driving teeth projecting outwardly from the bottom surface of said intermediate shaft portion; wherein said plurality of driving teeth are spaced from one another and arranged in a circular pattern on the bottom of said intermediate shaft portion; and, wherein each of said plurality of teeth are fabricated from a generally resilient material with the length and thickness of the teeth being dimensioned such that only a limited driving force can be exerted upon the cassette tape spool prior to the disengagement of the driving force between the device and the cassette tape spool.

2. A device as in claim 1; wherein, said resilient material comprises plastic.

3. A device as in claim 1; wherein, said resilient material comprises wood.

* * * * *